2/11/86 4,569,758

United States Patent [19]

Sandulyak et al.

[11] Patent Number: 4,569,758

[45] Date of Patent: Feb. 11, 1986

[54] SEPARATOR FOR MAGNETIC REMOVAL OF SOLID PARTICLES FROM FLUID MEDIA

[75] Inventors: Alexandr V. Sandulyak; Vyacheslav I. Garaschenko; Vladimir V. Sandulyak; Oleg J. Korkhov, all of Rovno, U.S.S.R.

[73] Assignee: Ukrainsky Institut Inzhenerov Vodnogo Khozyaistva, U.S.S.R.

[21] Appl. No.: 488,997

[22] Filed: Apr. 27, 1983

[51] Int. Cl.[4] ........ B03C 1/02; C02F 1/48

[52] U.S. Cl. ........ 210/222; 55/100; 210/388; 210/411

[58] Field of Search ........ 210/222, 223, 695, 243, 210/384, 388, 411; 55/3, 100; 209/223 A, 232, 214, 223 R

[56] References Cited

U.S. PATENT DOCUMENTS 3,286,841 11/1966 Dinglinger ........ 210/223
3,375,925 4/1968 Carpenter ........ 210/222
3,869,390 3/1975 Hertmann et al. ........ 210/222

FOREIGN PATENT DOCUMENTS 1084413 6/1960 Fed. Rep. of Germany ...... 210/222
2655140 2/1978 Fed. Rep. of Germany ... 209/223 R
394101 8/1973 U.S.S.R. ........ 210/222
768427 11/1980 U.S.S.R. ........ 55/100
802197 2/1981 U.S.S.R. ........ 210/222

*Primary Examiner*—Richard V. Fisher
*Assistant Examiner*—W. Gary Jones
*Attorney, Agent, or Firm*—Steinberg & Raskin

[57] ABSTRACT

A separator for magnetical removal of solid particles from fluid media comprises a flow chamber filled with a rod-type ferromagnetic orienting packing, and a magnetic system for magnetizing the packing. The packing rods are arranged along the flow of the medium being purified and contact each other over lateral surfaces thereof.

3 Claims, 5 Drawing Figures

SEPARATOR FOR MAGNETIC REMOVAL OF SOLID PARTICLES FROM FLUID MEDIA

BACKGROUND OF THE INVENTION

The present invention relates to magnetic separators and in particular to separators for magnetic removal of solid particles from fluid media. Such separators may be used to advantage in heat and power engineering, metallurgy, machine-building, chemical and other industries primarily for fine and coarse cleaning, say, of ammonia, ammonia water, alkalies, condensates, circulating water, machine oil, steam and like fluid media to remove products of corrosion of equipment, products of wear of parts of various machines and mechanisms, machining products, dispersed scale, etc.

Known in the art are various separators with magnetizable packings whose elements attract ferromagnetic particles from media flowing through the packing under the action of a polygradient magnetic field. For example, the separator for magnetic removal of solid particles from fluid media according to USSR Inventor's Certificate No. 394,101 filed Aug. 22, 1973 comprises a flow chamber provided with connections to let in and out a fluid medium and filled with a rod-type ferromagnetic filter packing, and a magnetic system for magnetizing the packing. In the device under review the packing rods are not in contact with one another, and the medium being cleaned flows through gaps between the rods perpendicularly to longitudinal axes thereof.

The aforesaid device may be used only for coarse magnetic separation since the presence of gaps between the generating lines of the rods is a factor increasing a magnetic field strength therebetween and reducing effectiveness in deposition of microparticles considered to be impurities.

SUMMARY OF THE INVENTION

A primary object of the invention is to improve purification of a fluid medium, as regards solid microimpurities, in a magnetic separator with a rod-type filter packing.

Another object of the invention is to improve quality of a fluid medium and to facilitate removal of trapped particles from a packing by washing.

There is provided a separator for magnetic removal of solid particles from fluid media comprising a flow chamber provided with connections to let in and out of fluid medium and filled with a rod-type ferromagnetic filter packing, and a magnetic system for magnetizing the packing, in which, according to the invention, the packing rods are oriented so that longitudinal axes thereof are directed along the flow of the medium being cleaned and contact each other over lateral surfaces thereof.

To facilitate removal of trapped particles from the packing by washing, it is of advantage that the rod packing should be composed of two parts, each part having a base mounting the rods secured thereto on first ends and being disposed so that the rods of one part are contained in gaps between the rods of the other part, one of the parts being installed in a manner allowing reciprocating motion thereof with respect to the other part.

To reduce the weight of the packing and of construction as a whole, it is further advantageous that the rods should represent hollow structures, for example, tubes.

It is preferable that the rods should be cone structures tapering towards free ends of the rods, an advantage enabling breakage of contact lines and separation of the rods by displacing one of the packing parts with respect to the other part.

An advantage of the separator for magnetic removal of solid particles from fluid media forming the subject of the invention is that, owing to the presence of the lines of contact between the rods, a magnetic field set up in close proximity to the lines of contact is stronger than a magnetic field set up between the noncontacting rods and possesses a higher degree of nonuniformity. This produces magnetic forces required to effectively trap solid particles, including microimpurities, from the medium flowing parallel to the longitudinal axes of the rods. (Said medium may not flow perpendicularly to said rods).

BRIEF DESCRIPTION OF DRAWINGS

The invention will now be described further with reference to specific embodiments thereof, taken in conjunction with the accompanying drawings, wherein.

DETAILED DESCRIPTION OF THE PREFERRED EMBODIMENTS

Figure 1:
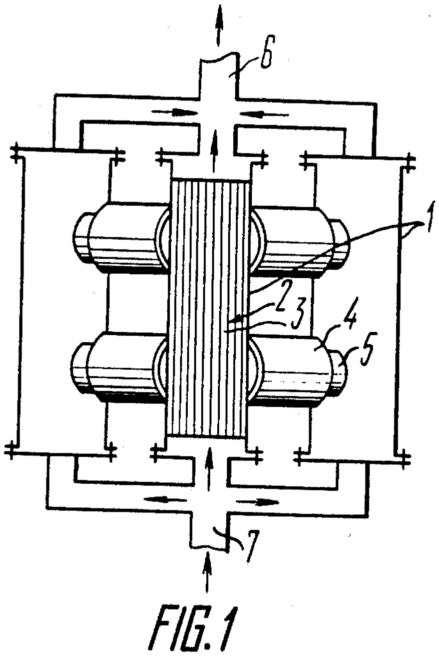
FIG. 1 is a general view of a six-chamber elecromagnetic separator for magnetic removal of solid particles from fluid media comprising a packing made of contacting rods arranged along chamber axes according to the invention.
Figure 2:
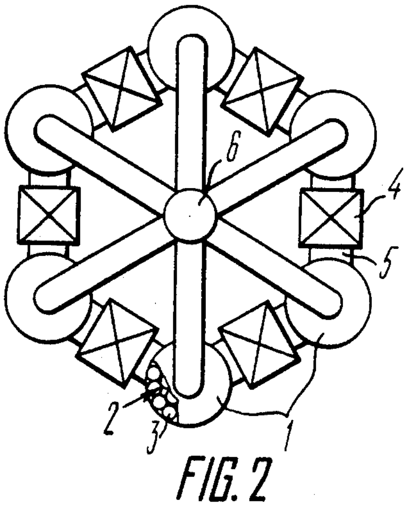
FIG. 2 is a top view of the separator of FIG. 1, including a partial section of one of the chambers according to the invention.

Referring initially to FIGS. 1 and 2 the separator in compliance with the invention comprises six cylindrical chambers 1, each of which accommodates a rod-type ferromagnetic filter packing 2 composed of rods 3 contacting one another over lateral surfaces thereof and arranged along the axes of the chambers 1 (along the flow of a medium being cleaned). The separator also incorporates a magnetizing system including windings 4 disposed on cores 5 which are conjugated with enclosures of the chambers 1. The cores 5 and the chambers 1 with the packing 2 are alternatively arranged along a hypothetical circumference, thereby forming a closed loop. The chambers 1 are connected with a common connection 6 used to let out the purified fluid medium in its upper portion and with a connection 7 used to let in the fluid medium to be cleaned in its lower portion. (The chambers 1 may be provided with individual inlet and outlet connections when fluid media differing as to composition and function are to be cleaned).

Figure 3:
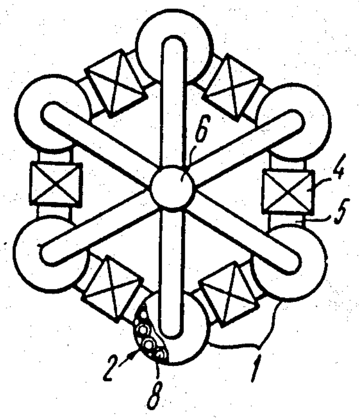
FIG. 3 shows the electromagnetic separator of FIG. 2 with hollow (tubular) rods.

FIG. 3 is a top view of the electromagnetic separator of FIG. 1 with a section of one of the chambers 1, which accommodates the ferromagnetic packing 2 composed of hollow contacting rods 8, say, steel pipes closed in the upper and lower portions to preclude flow of the fluid medium into the tubes 8.

Figure 4:
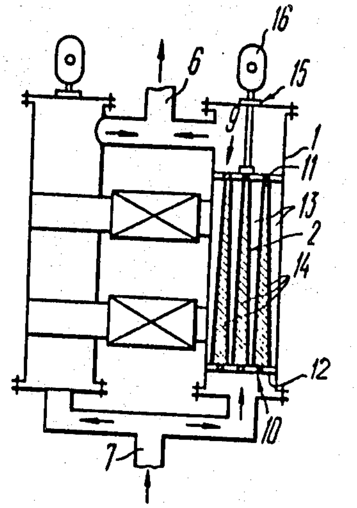
FIG. 4 is a general view of a two-chamber electromagnetic separator with a packing composed of two parts.
Figure 5:
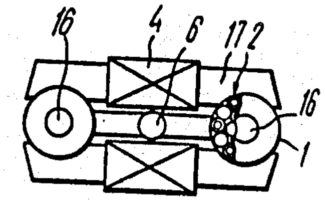
FIG. 5 is a top view of the separator of FIG. 4 with a partial section of one of the chambers according to the invention.

The electromagnetic separator of FIGS. 4 and 5 comprises two cylindrical flow chambers 1, each of which accommodates the rod-type ferromagnetic filter packing 2 composed of two parts 9 and 10 fitted in each other. Each of the parts 9 and 10 of the packing includes bases 11 and 12 which represent latticed structures to enable flow of the medium being cleaned. Said bases mount rods 13 and 14 secured thereto on first ends, the rods 13 of the part 9 being located in gaps between the rods 14 of the part 10. The base 11 of the part 9 is connected with a reciprocating drive 15 having a motor 16. As the part 9 moves upwards, the rods 13 which are made hollow to reduce the weight of the part 9 are displaced with respect to the rods 14, thereby shortening common contact lines. In the preferred embodiment the rods 13 and 14 are cone structures tapering towards free ends of the rods. With the part 9 moving upwards, the rods 13 and 14 move apart, thus breaking the common contact line. The packing 2 is magnetized by the magnetizing system comprising the electrical windings 4 located on cores 17 conjugated with the enclosure of the chambers 1. The magnetizing system may also comprise permanent magnets installed in a manner allowing their turn or withdrawal to periodically interrupt the magnetic field (not shown in the drawing).

The separator forming the subject of the invention operates in the following manner. Applying voltage to the windings 4 (FIGS. 1 through 5) magnetizes the cores 5, 17 and the ferromagnetic rod-type packing 2 contained within the chambers 1. Thereafter a fluid medium is fed to the separator. Ferromagnetic particles are removed from the medium as it passes through the packing 2 in the chambers 1, said medium being subsequently removed from the separator via the connection 6. A strong magnetic field possessing a high degree of nonuniformity is set up in close proximity to the lines of contact due to the presence of a contact between the rods. This produces magnetic forces sufficient to effectively trap solid particles (including microimpurities) from the fluid medium flowing between the packing rods.

When the need arises for removing trapped particles from the packing 2 (FIG. 4) by washing, the part 9 of the packing 2 should be moved away from the part 10 by the drive 15, which ensures prewashing "loosening" of the deposit localized in the vicinity of the lines of contact of the rods 13 and 14 and displacement of the part 9 relative to the part 10. Thus, the separator is adjusted for a desired fluid medium cleaning mode, and a gap is provided between the rods to enable deposition of particles of a particular size in the packing 2, depending on production characteristics of the fluid medium.

What is claimed is:

1. A separator for magnetic removal of solid particles from a fluid medium, comprising:

means defining a flow chamber;

an inlet connection for introducing the fluid medium into said chamber;

an outlet connection for discharging the fluid medium from said chamber;

a rod-type ferromagnetic filter packing arranged within said chamber and comprising a plurality of elongate rods oriented so that their longitudinal axes substantially extend along the direction of flow of the fluid medium, said rods being in line contact with one another along lateral surfaces thereof during operation, to enable the fluid medium to flow through said packing, wherein said packing is composed of two parts, a first one of said parts comprising a first base and a first group of about one-half of said plurality of rods, each of said rods of said first group having one end connected to said first base and an opposite free end, a second one of said parts comprising a second base and a second group of about the other one-half of said plurality of rods, each of said rods of said second group having one end connected to said second base and an opposite free end, said first and second parts facing each other so that rods of said first group are disposed between rods of said second group, said rods being substantially cone-shaped and tapering towards the free ends thereof;

and also comprising means for moving at least one of said parts towards and away from said other of said parts; and a magnetic system for magnetizing said packing.

2. A separator as claimed in claim 1, wherein said rods are hollow.

3. A separator as claimed in claim 2, wherein said ends of each of said rods are closed to preclude flow of the fluid medium into the hollow space defined therewithin.

* * * * *